(12) United States Patent
Addiego et al.

(10) Patent No.: US 9,610,561 B2
(45) Date of Patent: Apr. 4, 2017

(54) METHOD OF MAKING A HONEYCOMB HAVING CHANNELS CONTAINING A POROUS ADSORBENT

(71) Applicant: Corning Incorporated, Corning, NY (US)

(72) Inventors: William Peter Addiego, Big Flats, NY (US); Benedict Yorke Johnson, Horseheads, NY (US); Lingyan Wang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/809,460

(22) Filed: Jul. 27, 2015

(65) Prior Publication Data
US 2016/0038915 A1 Feb. 11, 2016

Related U.S. Application Data

(60) Provisional application No. 62/035,740, filed on Aug. 11, 2014.

(51) Int. Cl.

| | |
|---|---|
| *B01J 20/02* | (2006.01) |
| *B01J 20/28* | (2006.01) |
| *B01J 20/20* | (2006.01) |
| *B01J 20/08* | (2006.01) |
| *B01J 20/30* | (2006.01) |
| *B01J 20/32* | (2006.01) |
| *B01D 53/04* | (2006.01) |
| *B01J 20/18* | (2006.01) |
| *B01J 20/26* | (2006.01) |
| *C04B 38/00* | (2006.01) |
| *C02F 1/28* | (2006.01) |
| *C02F 101/20* | (2006.01) |

(52) U.S. Cl.
CPC .... *B01J 20/28045* (2013.01); *B01D 53/0407* (2013.01); *B01J 20/08* (2013.01); *B01J 20/18* (2013.01); *B01J 20/20* (2013.01); *B01J 20/26* (2013.01); *B01J 20/3078* (2013.01); *B01J 20/3085* (2013.01); *B01J 20/324* (2013.01); *B01J 20/3236* (2013.01); *B01J 20/3291* (2013.01); *C02F 1/28* (2013.01); *C04B 38/0006* (2013.01); *C04B 38/0012* (2013.01); *C02F 2101/20* (2013.01)

(58) Field of Classification Search
CPC ............. B01J 20/08; B01J 20/18; B01J 20/20
See application file for complete search history.

(56) References Cited

U.S. PATENT DOCUMENTS

| | | |
|---|---|---|
| 2,734,843 A | 2/1956 | Steele |
| 3,226,460 A | 12/1965 | Dietzsch |
| 3,733,229 A | 5/1973 | Scheer et al. |
| 3,788,486 A | 1/1974 | Bergstrom |
| 4,409,054 A | 10/1983 | Ryan |
| 5,260,035 A | 11/1993 | Lachman et al. |
| 6,228,803 B1 * | 5/2001 | Gadkaree ................. B01J 20/20 428/402 |
| 6,296,794 B1 | 10/2001 | Day et al. |
| 6,303,368 B1 * | 10/2001 | Cutler .................. B01J 19/2485 210/616 |
| 8,101,283 B2 | 1/2012 | Pyzik |
| 8,545,610 B2 | 10/2013 | Makino et al. |
| 2005/0178709 A1 | 8/2005 | Nakanishi et al. |

FOREIGN PATENT DOCUMENTS

| | | |
|---|---|---|
| CA | 2453407 | 2/2003 |
| EP | 0992272 | 4/2000 |
| JP | 2009191688 | 8/2009 |

OTHER PUBLICATIONS

International Search Report, issued in connection with corresponding PCT application No. PCT/US2015/044162, Oct. 28, 2015.

* cited by examiner

*Primary Examiner* — Stuart Hendrickson
(74) *Attorney, Agent, or Firm* — John L. Haack

(57) ABSTRACT

A method of making a filter article having a honeycomb substrate having adsorbent filled channels, including:
  sealing the first end of a porous, cellular honeycomb substrate;
  filling the channels of the cellular honeycomb substrate with a dry adsorbent source material;
  sealing the second end of the filled honeycomb to form a sealed honeycomb;
  contacting the sealed honeycomb and water for a time sufficient to convert the dry precursor material in-situ to a paste;
  removing the seals from the first and second ends; and
  heating the contacted honeycomb to convert the paste to an adsorbent.
Also disclosed is a filter article having a honeycomb substrate having adsorbent filled channels and methods of using the article.

8 Claims, 3 Drawing Sheets

METHOD OF MAKING A HONEYCOMB HAVING CHANNELS CONTAINING A POROUS ADSORBENT

This application claims the benefit of priority under 35 U.S.C. §119 of U.S. Provisional Application Ser. No. 62/035,740 filed on Aug. 11, 2014, the content of which is relied upon and incorporated herein by reference in its entirety.

The entire disclosure of each publication or patent document mentioned herein is incorporated by reference.

BACKGROUND

The disclosure relates to a honeycomb article having filled channels.

SUMMARY

In embodiments, the disclosure provides a honeycomb article having its channels filled with a porous adsorbent, and to methods of making and using the article.

In embodiments, the disclosure provides a method of making a porous adsorbent structure within the channels of a honeycomb substrate. The method overcomes or at least ameliorates shortcomings associated with the prior art discussed below regarding forming adsorbent structures within the channels of a honeycomb substrate.

In embodiments, the disclosure provides a method of making a honeycomb article, or similar articles, having the interior channels filled with a fixed and porous adsorbent.

In embodiments, the disclosure provides a method of making a porous adsorbent within a honeycomb channel, that is, a method of synthesizing porous adsorbents inside the channels of the honeycomb.

BRIEF DESCRIPTION OF THE DRAWINGS

In embodiments of the disclosure.

DETAILED DESCRIPTION

Figure 1:
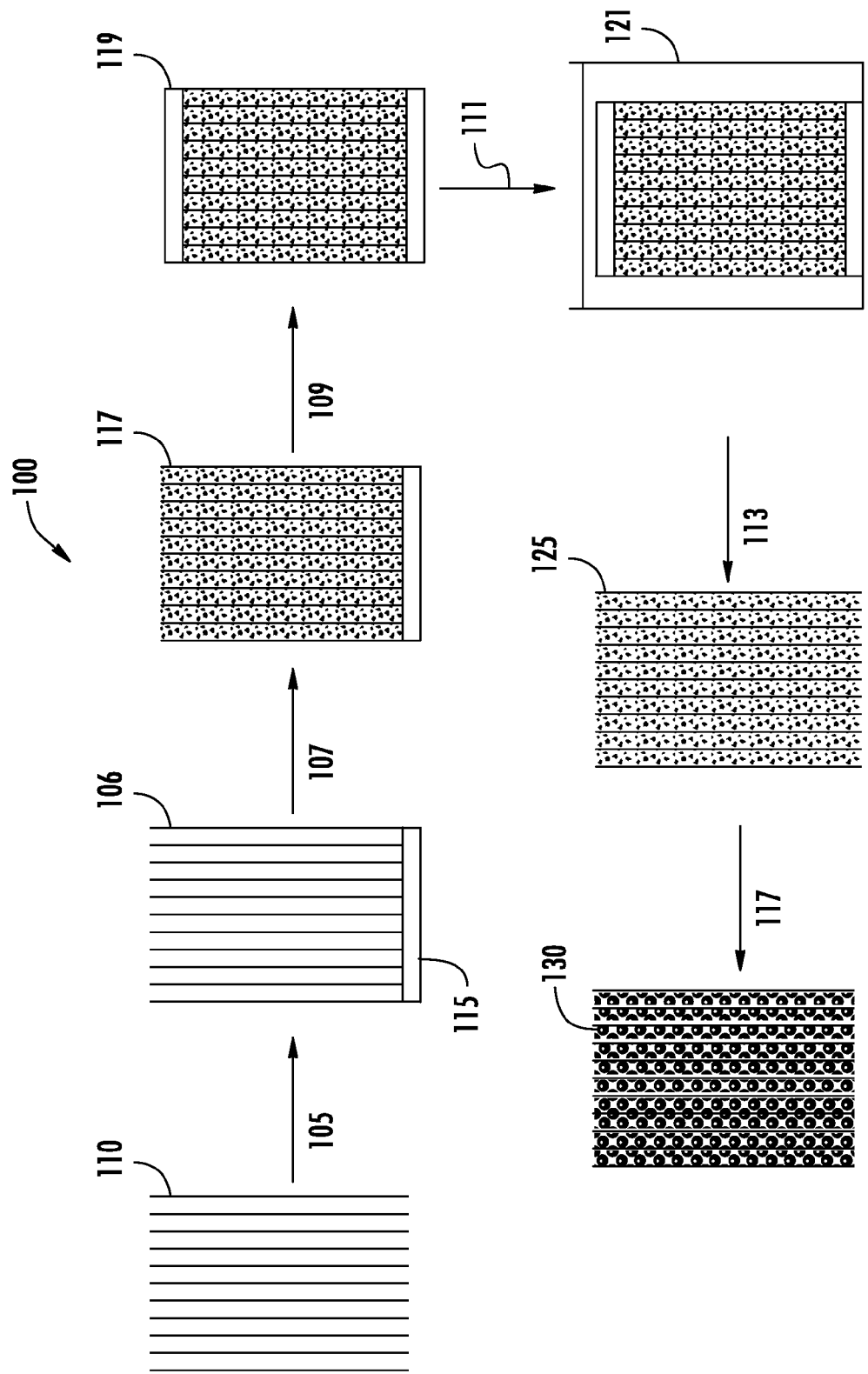
FIG. 1 shows a flow diagram for making a porous adsorbent structure within the channels of a honeycomb substrate.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

In embodiments, the disclosed article, and the disclosed method of making and using the article provide one or more advantageous features or aspects, including for example as discussed below. Features or aspects recited in any of the claims are generally applicable to all facets of the invention. Any recited single or multiple feature or aspect in any one claim can be combined or permuted with any other recited feature or aspect in any other claim or claims.

Definitions

"High porosity filter," "HPF," or like terms refer to, for example, a honeycomb filter having a material porosity (i.e., the porosity of the web or wall material) of greater than or equal to about 40 vol %, as measured by mercury intrusion porosimetry, and having a variety of pore diameter sizes of from 20 angstroms to greater than 100 microns, and in such combinations not limited by any particular distribution. Honeycomb cell geometries can have a variety of combinations to suit the application, for example, a very low cell density such as less than 50 cpsi to a high cell density such as greater than 600 cpsi such as 1,000 to 2,000 cpsi, and wall (web) thickness of 0.001 to 0.002 inch to greater than 0.015 inch thick. In one instance, a filled honeycomb having 25 cpsi and 0.025 inch thick porous walls might be called for. In another instance, a filled honeycomb having 1,000 cpsi and 0.002 inch walls may be called for.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The composition and methods of the disclosure can include any value or any combination of the values, specific values, more specific values, and preferred values described herein, including explicit or implicit intermediate values and ranges.

The disclosure relates to technical solutions to the problem of diminishing water resources for an ever-growing population. The available resources can be seriously affected by pollution. It is evident that remediation technologies are an important part of the solution to the problem of water quality with adsorption generally accepted as one of the best. Many adsorption based filter designs for the removal of unwanted impurities from drinking water supplies are known. These include the increasingly common water filters, commercially sold as a replaceable cartridge-type filter at relatively low cost. These filters are reasonably effective for the removal of unwanted tastes, odors, and harmful pollutants from drinking water. Replaceable filter cartridges of these types are typically packed-bed units containing carbon pellets for the removal of adsorbable or catalyzable constituents such as chlorine and organics.

Although gaining in acceptance, filters designed for use in replaceable cartridge filtration systems suffer from a number of disadvantages. Packed bed systems typically develop preferential flow paths within the bed, resulting in less than optimal use of the available adsorbents and exchange media, and correspondingly decreased purifying effectiveness and service life. Packed beds also tend to release fine adsorbent particles into the treated water during initial use.

Commercially available activated carbon, activated alumina, and zeolites, among other types of absorbents, can be formed into honeycomb filters, the structure of which addresses the aforementioned issues of a typical packed bed. Commercially, honeycomb filters made of activated carbon are typically used to clean air of VOCs and odors. However, many available honeycomb filters are made of refractory ceramic or metals having a low surface area, for example, less than 10 m$^2$/g.

Porous honeycomb monolith structures consist of a large number of parallel channels that provide high contact efficiencies between the monolith and the flow streams. These structures are particularly suitable as adsorbents or supports for catalysts when large volumes of fluid are treated, because they offer short diffusion lengths and a remarkably high and easily accessible geometric surface area per unit volume and improved chemical residence times for reactions to reach completion in high-flow conditions. The monoliths also exhibit unique features of low pressure drop when treating dynamically large volumes of fluid, leading to energy savings. The replacement of the filters upon saturation is easier because they are unitary structures. Additionally, the monoliths exhibit good mechanical properties and freedom from attrition and fluidization problems of conventional packed bed adsorbents. There are two common configurations of honeycomb structures namely flow-through and wall-flow. While the flow-through configuration of honeycomb structure works well for laminar-flow catalytic conversion, its utility is limited in filtration, such as in trapping particulates, but is also of limited utility where maximum absorption capacity is significant. It is significant in such wall-flow designs to engineer superior wall saturation and residence time with the intended absorbates to increase filtration efficiency while retaining the design benefits of the cellular honeycomb structure, such as uniform flow, no liquid hold-up, and low back pressure. In the wall-flow design, alternate or adjacent cells or channels are blocked (i.e., plugged) leading to turbulent flow and forced convection of fluid through the permeable walls of the honeycomb. The wall-flow or plugged honeycomb filters are now widely used as they offer high sorbent utilization and filtration efficiency. One disadvantage of these wall-flow filter elements, however, is cost. The porous ceramic honeycombs used in these filter designs to support adsorbents and provide wall filtration are relatively expensive. Further, manufacturing processes for infiltrating the ceramics with adsorbents, or other active filtering materials are somewhat elaborate and time-consuming, as are methods for plugging of the honeycombs to define effective filtration flow paths through the honeycomb walls.

A number of attempts have been made to develop cost-effective and high efficiency honeycomb structures for use as fluid filters. For example, a number of attempts have been made to use pressing processes to preform plugged honeycomb filters that avoid extrusion and plugging (e.g., U.S. Pat. Nos. 6,296,794, 3,226,460, and 3,788,486). Unfortunately, none of the various pressing methods for making honeycomb structures for use as fluid filters have proven adaptable for the economic commercial production of filters for drinking water purification in large volumes. In other approaches, as exemplified in U.S. Pat. Nos. 4,409,054, and 5,260,035, composite honeycomb structures are formed by mixing dry constituents with a liquid binder to form a paste and then packing the paste into the honeycomb cells. With this method of applying the paste to the honeycomb structure various difficulties have been encountered. The uniformity of application is quite variable; consequently, when a complete filling of the cells is desired, it may not be consistently achieved. The results can depend to a large extent on the skill of the operator. Additionally, a honeycomb with fine channels, such as having a cell density of 400 cell/in$^2$ (cpsi) with thick walls, such as 0.020 inch, has a very small hydraulic opening of about 0.035 inch. Also, a very high cell density honeycomb, such as 1200 cell/in$^2$ with thinner walls, such as 0.008 inch, has channels with a hydraulic diameter of only 0.021 inch. These geometries are difficult to uniformly fill with a paste.

U.S. Pat. No. 8,545,610, entitled "Fuel vapor treating apparatuses having a high thermal conductive honeycomb core," mentions an adsorbent canister having a housing defining an adsorption chamber therein, an adsorbent filled in the adsorption chamber, and a honeycomb core.

JP Laid-Open Pat. Pub. No. 2009-191688 mentions an adsorbent canister (fuel vapor treating apparatus) having a housing that defines an adsorption chamber therein. The adsorption chamber is filled with an adsorbent, such as granule-shaped activated carbon, capable of temporarily trapping fuel vapor and then desorbing the fuel vapor due to airflow in the adsorption chamber.

In embodiments, the present disclosure provides a honeycomb structure having an adsorbent filter medium within the channels of the honeycomb structure, which structure can be used, for example, in a water filtration system.

In embodiments, the disclosure provides a water filtration system having a honeycomb filter having improved sorbent utilization and enhanced filtering efficiency.

In embodiments, the disclosure provides a water filtration system that can be easily manufactured, affordably priced, and can be readily tailored to meet the treatment demands of a particular water supply depending on the quality of the input water supply.

In embodiments, the disclosure provides a method of making a honeycomb having filled channels comprising, for example:

providing a porous and cellular honeycomb substrate;

filling the cellular channels of the honeycomb substrate with a dry, adsorbent source material or adsorbent precursor material, such as a powder mixture, of the adsorbent to be generated, or synthesized;

sealing, e.g., blocking, both ends of the filled honeycomb to form a sealed honeycomb;

contacting, e.g., soaking, imbibing, and like treatment actions, the sealed honeycomb and water for a time sufficient to convert the dry precursor material in-situ to a paste;

removing the seals from the first and second ends of the contacted honeycomb; and heating the contacted honeycomb, i.e., the paste-filled honeycomb substrate, to convert the paste to an adsorbent.

In embodiments, filling the channels of the honeycomb substrate with a dry, adsorbent source material or adsorbent precursor material can be, for example, filled partially or completely, such as from 80 to 100%, preferably from 90 to 100%, more preferably from 95 to 100%, of the void volume of the channels.

In embodiments, the least one adsorbent can be selected from, for example: activated carbon, activated alumina, zeolite, a polymer, a composite of a polymer and inorganic absorbent, a composite of a polymer and carrier, or mixtures thereof.

The disclosed filled honeycomb article can have an adsorbent structure that permits simultaneous achievement of increased sorbent utilization and filtering efficiency. The disclosed high volume filling of adsorbent material in the honeycomb provides for maximum adsorption capacity.

In embodiment, the disclosure provides a method of making a honeycomb article having adsorbent filled channels, comprising:

sealing the first end of a porous, cellular honeycomb substrate;

completely filling the channels of the cellular honeycomb substrate with an adsorbent source material, i.e., a precursor of the adsorbent to be generated, such as a dry, adsorbent source material;

sealing the second end of the completely filled honeycomb to form a sealed filled honeycomb;

contacting the sealed filled honeycomb and an aqueous liquid, e.g., water, for a time sufficient to convert the adsorbent source material, that is the dry adsorbent precursor material in-situ, to a paste in the contacted honeycomb;

removing the seals from the first and second ends of the contacted honeycomb; and heating the contacted honeycomb to convert the paste to an adsorbent.

In embodiments, heating the contacted honeycomb can be accomplished by firing, for example, at from 25 to 1,000° C. for from 1 to 125 hrs, including intermediate values and ranges.

In embodiments, the porous, cellular honeycomb substrate can be, for example, a ceramic material, or an activated carbon.

In embodiments, the adsorbent is at least one of: a nanoscale zero valent iron (NZVI), a metal oxide, activated carbon, or a combination thereof.

In embodiments, sealing of the first end and the second end can be accomplished with a tape, a film, a puck, an end cover, a press fit lid, or a combination thereof.

In embodiments, the aqueous liquid is water.

In embodiments, contacting the sealed filled honeycomb and an aqueous liquid for a time sufficient to convert the adsorbent source material to a paste can be accomplished, for example, in from 0.1 minute to 10 hrs, preferably from 0.1 min to 5 hrs, more preferably, from 0.5 min to 1 hr, even more preferably 1 min to 30 mins.

In embodiments, filling the channels of the cellular honeycomb substrate with an adsorbent source material can be, for example, from 95 to 100 vol % of the total void volume of the honeycomb channels.

In embodiments, the disclosure provides a honeycomb filter comprising:

a honeycomb body having a plurality of channels through the body, the plurality of channels being filled with at least one adsorbent material in from 90 to 100 vol % of the available channel void volume.

In embodiments, the at least one adsorbent material can be, for example, fixed to itself, fixed to the channel walls, or a combination thereof, so that the adsorbent material does not fall out or leak out of the channels of the honeycomb body, even when shaken or vibrated.

In embodiments, the at least one adsorbent material can be, selected, for example, from: an activated carbon, an activated alumina, a zeolite, an iron oxide, or mixtures thereof.

In embodiments, the plurality of channels through the body can be, for example, from 100 to 2,000 cells per square inch (cpsi).

In embodiments, the filter can have a filter efficiency of, for example, from 75% to 99%, as determined by the removal of a selected analyte. The filter efficiency (FE) is given by:

$$FE=\{[\text{inlet concentration}]-[\text{outlet concentration}]/[\text{inlet concentration}]\}\times 100,$$

and may depend, for example, on the selected analyte, instrument's detection limit for the selected analyte, and like considerations. Filter efficiency characterization for honeycomb filters are generally known.

In embodiments, the disclosure provides a honeycomb structure, which structure has channels that are completely filled with a porous adsorbent material and to a method of making the filled honeycomb structure.

Referring to the Figures, FIG. 1 shows a flow diagram (100) for fabricating a porous adsorbent structure within the channels of a honeycomb substrate.

One procedure for preparing the adsorbent filled honeycomb substrate can be, for example:

one end of the honeycomb substrate (110) is temporarily blocked or sealed (105) with a suitable blocking or sealing material, such as a tape or sealant such a parafilm, to provide a partially sealed honeycomb substrate (106) having seal (115);

the channels of the partially sealed honeycomb are filled (107) with a dry precursor material of the adsorbent to be generated or synthesized, to provide a dry precursor filled honeycomb (117), and the filling can be facilitated by, for example, shaking or application of vibration to the honeycomb;

the open end or fill-end of the honeycomb is also temporarily blocked or sealed with a suitable tape or a seal (109), which can be the same or different from the first temporary seal, to provide the precursor filled honeycomb (119) sealed at both ends;

the precursor material (e.g., powder or particulate) filled honeycomb is contacted with water (111), for example, soaked in water or immersed in water in a suitable container or tank (121) for a time sufficient to in-situ convert the precursor material (e.g., powder mixture) into an adherent (i.e., non-flowing) paste;

the sealing tapes at the ends of the honeycomb are removed, and the paste-filled honeycomb is dried (113), for example, in an air-vented oven, to provide the dry filled honeycomb (125); and the dried honeycomb sample is thermally treated (117), such as firing, to covert the filled paste to the desired adsorbent, that is to form a porous adsorbent structure inside the honeycomb channels to provide the porous adsorbent filled honeycomb (130).

The honeycomb substrate used in the disclosure can be, for example, an extruded ceramic substrate or an activated carbon substrate having, for example, a square, a rectangular, a circular, a triangular, a hexagonal, and like end face cell geometries, or combinations thereof, and their corresponding through body channels separated by highly porous walls. The cell density can be, for example, from 100 to about 2,000, from 100 to about 1,600, from 100 to about 1,400, from 100 to about 1,200 cells per square inch (cpsi), including intermediate values and ranges. The honeycomb substrate can be manufactured, for example, with existing extrusion technology.

The porous adsorbent(s) can be prepared by mixing together, for example, a suitable precursor material, a suitable binder, and a suitable pore former. Non-limiting examples of adsorbents that can be synthesized by the process of the disclosure includes a nanoscale zero valent iron (NZVI), metal oxides such as γ-alumina, zeolite, and like materials, or combinations thereof.

Suitable binder can include thermosetting resins, for example, a phenolic resin, a thermoplastic resin, and the like resins, or combinations thereof, such as polyvinylidene chloride, polyvinyl chloride, polyvinyl alcohol, and like resins. Suitable pore former can include, for example, a starch, a cellulosic, a thermoplastic polymer, and like materials, or combinations thereof.

Figure 2:
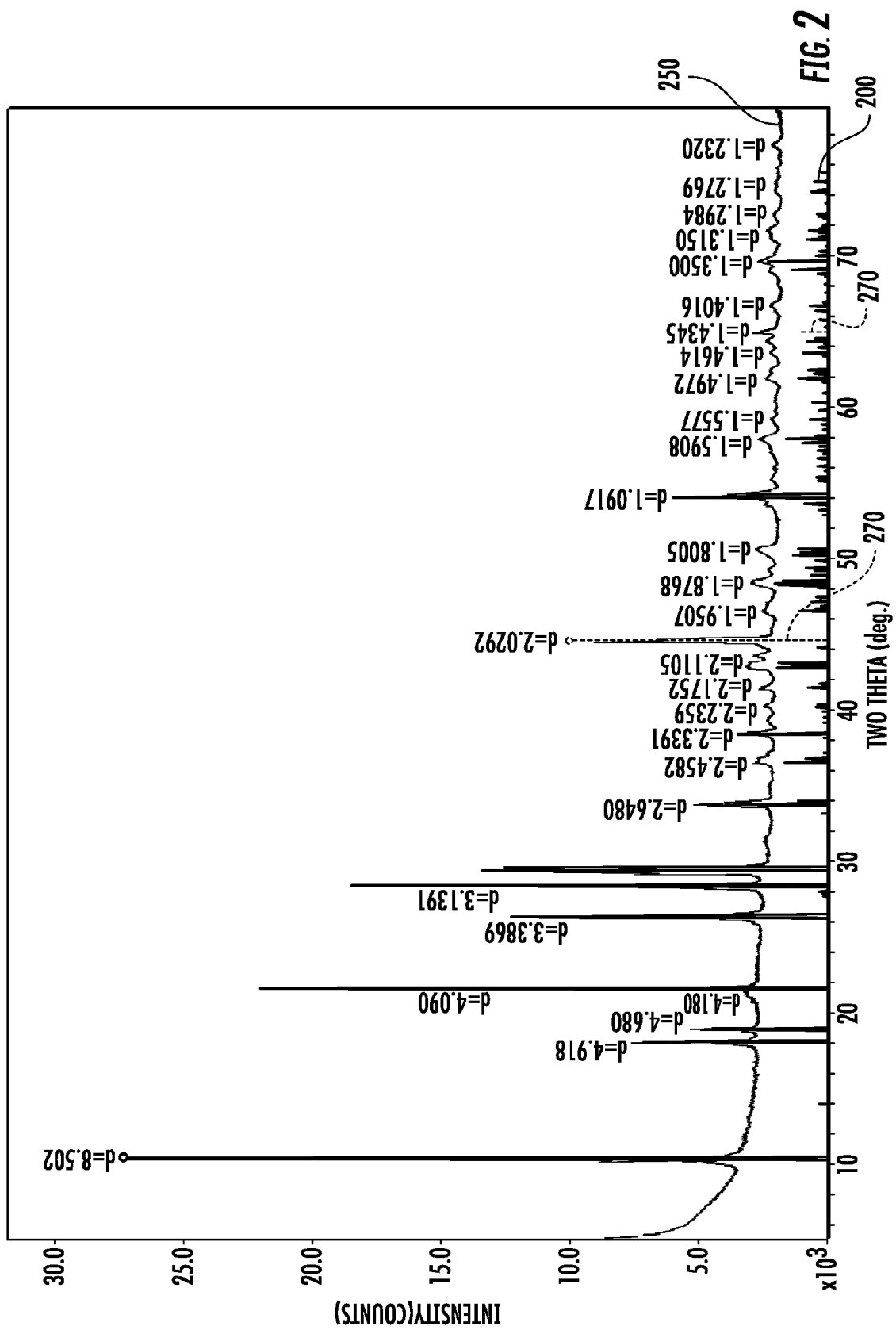
FIG. 2 is an XRD spectrum obtained from a 300 cpsi cordierite honeycomb high porosity filter (HPF) substrate filled with iron-activated carbon.

FIG. 2 includes an XRD spectrum obtained from a high porosity filter (HPF) substrate filled with iron-activated carbon adsorbent. Trace (200) represents the honeycomb substrate of cordierite of the formula $Mg_2Al_4Si_5O_{18}$. Trace (250) represents the composite spectrum of the cordierite and the iron and undetected (undetectable) activated carbon. Trace (270) represents the spectrum of the iron.

Figure 3:
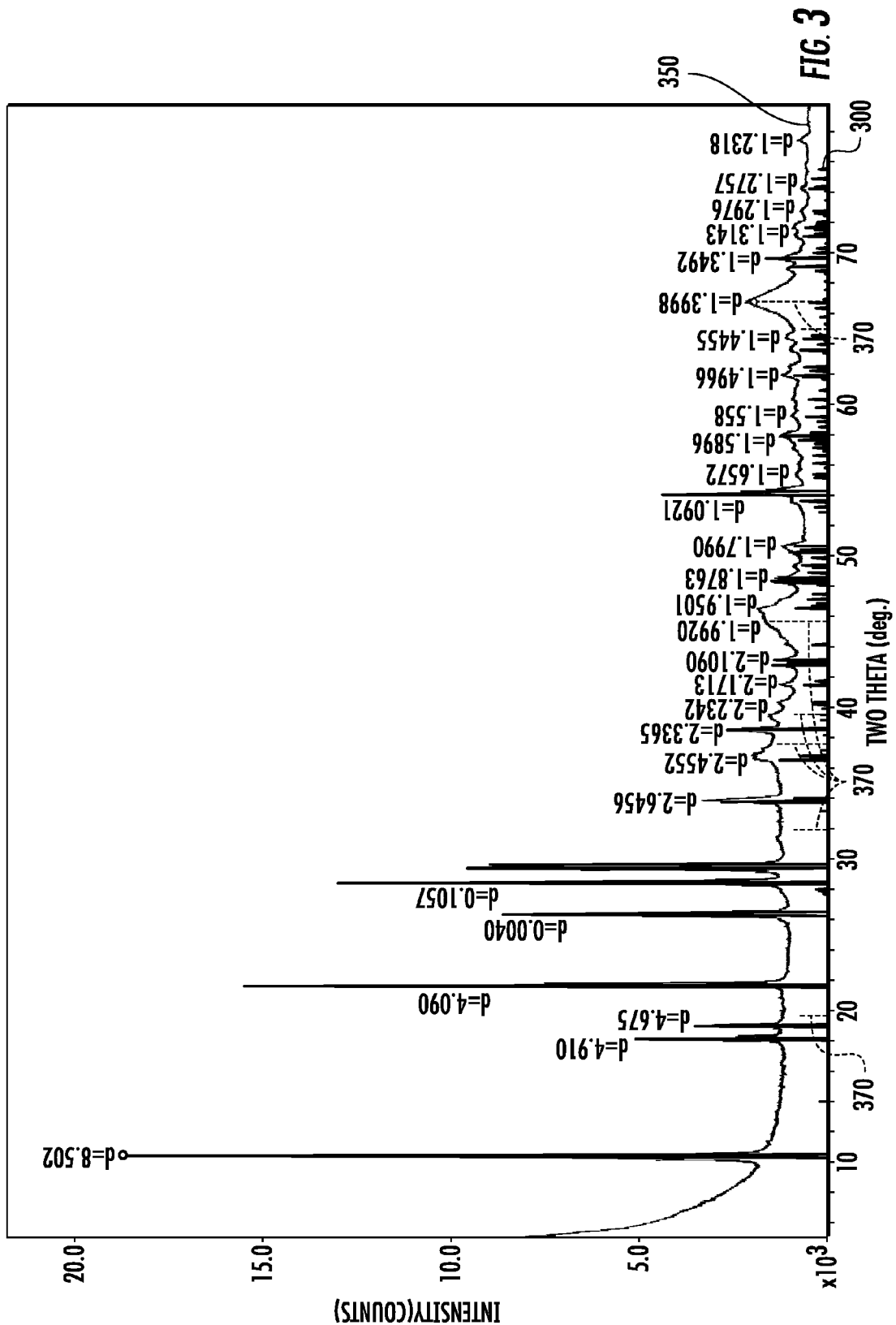
FIG. 3 is an XRD spectrum obtained from a high porosity filter substrate filled with γ-alumina.

FIG. 3 includes an XRD spectrum obtained from a high porosity filter substrate having channels filled with γ-alumina ($Al_2O_3$) adsorbent. Trace (300) represents the honeycomb substrate of cordierite of the formula $Mg_2Al_4Si_5O_{18}$. Trace (350) represents the composite spectrum of the cordierite and the aluminum oxide. Trace (370) represents the spectrum of the aluminum oxide ($Al_2O_3$).

EXAMPLES

The following Examples demonstrate making, use, and analysis of the disclosed filter article and methods of making in accordance with the above general procedures.

Example 1

Synthesis of Nanoscale Zero Valent Iron (NZVI)-Activated Carbon Composite (FE-AC) in a High Porosity Filter (HPF-FE-AC)

A high porosity cordierite honeycomb (HPF) substrate (1"D×1.5"L) having 300 cpsi and weighing 5.7 g was taped to seal at one end with a parafilm tape (a plastic paraffin film). The dry powder materials listed in Table 1 were thoroughly mixed and used as a precursor material (i.e., adsorbent source material) for the formation of FE-AC adsorbent. The honeycomb sample was then filled from the open end with about 7.5 g of the powder mixture. After that, the open end was taped to seal and the powder-filled honeycomb sample was soaked in DI water for 20 minutes. The water-soaked sample weighing 25 g was dried in an air vented oven at 140° C. and then heated up to 450° C. under flowing nitrogen where it was held for 3 hrs to convert the iron precursor to iron oxide. Finally, the sample was heated up to 750° C. and held for 5 hrs for thermal reduction of the iron oxide to zero valent iron (ZVI). The total weight gained after the heat treatment was 5.6 g. The FE-AC filled honeycomb sample (HPF-FE-AC) was characterized by the XRD presented in FIG. 2 and confirmed the formation and presence of the ZVI.

Filter Evaluation

The heavy metal removal capability of the prepared HPF-FE-AC sample was evaluated under dynamic adsorption conditions. The honeycomb sample was inserted into the adsorption column and an aqueous test solution containing 36 ppb As, 31 ppb Cd, 160 ppb Cr, 3000 ppb Cu, 140 ppb Se, 36 ppb Hg, and 160 ppb Pb was passed through the column at a flow rate of 100 mL/min for 20 min. The residual concentration of the heavy metals in the effluent from the adsorption column was analyzed with ICP-MS. The adsorption data is presented in Table 3. From the table it is apparent that the adsorbent is effective in removing heavy metals from water.

Example 2

Synthesis of Gamma Alumina (GA-AL)

The precursor composition for synthesizing γ-alumina was prepared by thoroughly mixing the dry ingredients provided in Table 2. A high porosity filter sample weighing 5.9 g was filled with the powder mixture according to the filling procedure described in Example 1. After soaking and drying as in Example 1, the sample was heated to 600° C. in air for 2 hrs. The sample was also characterized by XRD to determine the phase of alumina. The phase of alumina was confirmed to be γ-alumina as shown by the XRD spectrum in FIG. 3.

Example 3 (Prophetic)

Iron-Carbon Honeycomb-FE-AC-Filled Channels

The synthesis of nanoscale zero valent iron (NZVI)-activated carbon composite (FE-AC), is prepared as described in Example 1. The Fe—C honeycomb is made by batching iron oxalate, activated carbon, a fruit-nut flour, phenolic resin, methyl cellulose, lubricant, and water into an extrudable paste that is then extruded through a honeycomb die of desired cell geometry. The honeycomb is dried, cured, and carbonized in nitrogen at greater than 700° C. for 16 hrs. The honeycomb channels are then filled with the FE-AC absorbent powder and treated as described in Example 1 to yield a porous channel-filled honeycomb after firing at 750° C. in nitrogen.

Example 4 (Prophetic)

Iron-Carbon Honeycomb with Filled Polymer-Inorganic Composite Powder

In addition to inorganic absorbents, the disclosure envisions the use of polymeric absorbents, and composites of polymer and inorganic absorbents, and carriers, prepared as powders and filled in the honeycomb channels as described in previous examples. However, the article is not calcined after the channels are filled, but are only cured or otherwise cross-linked to yield a porous organic-inorganic hybrid absorbent that fills the honeycomb channels.

Example 5 (Prophetic)

Non-Porous Thin-Walled Polymer Honeycomb Having Absorbent Filled Channels

The channel-filled absorbent is made as described in Examples 1 to 3, but the monolith is a non-porous thin-walled honeycomb made of a structural plastic such as polystyrene with very thin walls, such as less than 3 mil, such that the open frontal area is greater than 80%, thus allowing for larger channels with high absorbent-filling capacity while providing the required strength. This design can offer advantages to low and high cell density geometries, for example: cell densities of from 100 to 400 cpsi; lower fabrication costs; versatile designs, forming and shaping capabilities; all-in-one housing fabrication; an efficient method to incorporate other polymeric materials and structures within the filter.

Example 6 (Prophetic)

Porous Silica-Gel Filled-Polymer Honeycomb Having Absorbent Filled Channels

The channel-filled absorbent is made as described in Examples 1 to 3, but the monolith is made with a composite of a polymer, such as polystyrene and porous filler, such as silica gel or gamma-alumina, such that the thin wall monolith, walls less than 5 mil, is both porous and strong with open frontal area greater than 80%, where the porous-walled honeycomb is made of a structural plastic such as polystyrene with sufficient porosity and high surface area inorganic (e.g., oxide) to impart porosity and permeability throughout the wall, allowing for additional water purifying components, such as species to trap and destroy microbes, trap fine particulates, and sequester heavy metal ions, in additional to the porous absorbents filling the channels of the honeycomb. The open frontal area is greater than 80%, thus allowing for large channels with high absorbent-filling capacity while providing the required strength.

Comparative Example 7

Metal Removal Performance of Iron-Carbon Honeycomb (FE-ACH)

The metal removal performance of iron-carbon honeycomb (FE-ACH) was evaluated for comparison. The FE-ACH was made by batching iron oxalate, activated carbon, a fruit-nut flour, phenolic resin, methyl cellulose, lubricant, and water into an extrudable paste that was then extruded through a honeycomb die of 1600/6 cell geometry. The honeycomb was dried, cured, and carbonized in nitrogen at 750° C. for 16 hr. The heavy metal removal capability of the FE-ACH sample was evaluated under the same conditions as the HPF-FE-AC sample in Example 1. The adsorption test results are presented in Table 4. It is evident from the results in Table 4 that FE-ACH sample underperformed the HPF-FE-AC sample of the present invention (see Table 3).

The disclosure has been described with reference to various specific embodiments and techniques. However, it should be understood that many variations and modifications are possible while remaining within the scope of the disclosure.

TABLE 1

Composition of the powder mixture for synthesizing the adsorbent (FE-AC) in Example 1.

| Material | Weight Percentage |
| --- | --- |
| Activated carbon powder | 20 |
| Iron oxalate | 35 |
| Rice starch | 10 |

TABLE 1-continued

Composition of the powder mixture for synthesizing the adsorbent (FE-AC) in Example 1.

| Material | Weight Percentage |
| --- | --- |
| Phenolic resin powder (Novalac) | 35 |

TABLE 2

Composition of the powder mixture for synthesizing the adsorbent (GA-AL) in Example 2.

| Material | Weight Percentage |
| --- | --- |
| γ-alumina | 50 |
| Rice starch | 15 |
| Boehmite | 35 |

TABLE 3

The concentration of heavy metals in the effluent water from an adsorption column containing high porosity filter substrate filled with iron-activated carbon (Example 1).

| | Metal concentration (ppb) | | | | | | |
| --- | --- | --- | --- | --- | --- | --- | --- |
| Sample ID | As | Cd | Cr | Cu | Se | Hg | Pb |
| Test solution | 36 | 31 | 160 | 3000 | 140 | 36 | 160 |
| HPF-FE-AC | 10 | 6 | 32 | 45 | 90 | 5 | less than 50 |

TABLE 4

The concentration of heavy metals in the effluent water from an adsorption column containing iron-activated carbon honeycomb without channel filling (Comparative Example 7).

| | Metal concentration (ppb) | | | | | | |
| --- | --- | --- | --- | --- | --- | --- | --- |
| Sample ID | As | Cd | Cr | Cu | Se | Hg | Pb |
| Test solution | 28 | 30 | 170 | 2300 | 140 | 32 | 160 |
| FE-ACH | 14 | 17 | 70 | 291 | 120 | 22 | less than 50 |

What is claimed is:

1. A method of making a honeycomb article having adsorbent filled channels, comprising:
    sealing the first end of a porous, cellular honeycomb substrate;
    filling the channels of the cellular honeycomb substrate with a dry adsorbent source material;
    sealing the second end of the channel filled cellular honeycomb to form a sealed, filled, honeycomb;
    contacting the sealed, filled, honeycomb and an aqueous liquid for a time sufficient to convert the adsorbent source material to a paste in the contacted honeycomb;
    removing the seals from the first and second ends of the contacted honeycomb; and
    heating the contacted honeycomb to convert the paste to an adsorbent.

2. The method of claim 1 wherein heating the contacted honeycomb is accomplished at from 25 to 1,000° C. for from 1 to 125 hrs.

3. The method of claim 1 wherein the porous, cellular honeycomb substrate comprises a ceramic, a polymer, or an activated carbon.

4. The method of claim 1 wherein the adsorbent is at least one of: nanoscale zero valent iron, a metal oxide, activated carbon, a polymer, a composite of a polymer and a metal oxide or inorganic absorbent, a composite of a polymer and carrier, or a combination thereof.

5. The method of claim 1 wherein sealing of the first end and the second end is accomplished with a tape, a film, a puck, an end cover, a press fit lid, or a combination thereof.

6. The method of claim 1 wherein the aqueous liquid is water.

7. The method of claim 1 wherein contacting the sealed filled honeycomb and an aqueous liquid for a time sufficient to convert the adsorbent source material to a paste is from 0.1 minute to 10 hrs.

8. The method of claim 1 wherein filling the channels of the cellular honeycomb substrate with an adsorbent source material is from 90 to 100 vol % of the total void volume of the honeycomb channels.

\* \* \* \* \*